United States Patent
Laurence et al.

(10) Patent No.: US 7,336,987 B2
(45) Date of Patent: Feb. 26, 2008

(54) METHOD AND APPARATUS FOR RAPID, NON-CONTACT MEASUREMENT OF THE CORE TEMPERATURE OF ANIMALS AND HUMANS

(76) Inventors: Laird W. Laurence, 2257 Highway 16 South, Fredericksburg, TX (US) 78624; Jack C. Laurence, 14006 Graywing, San Antonio, TX (US) 78231; James D. King, 7335 Wild Eagle St., San Antonio, TX (US) 78255

( * ) Notice: Subject to any disclaimer, the term of this patent is extended or adjusted under 35 U.S.C. 154(b) by 744 days.

(21) Appl. No.: 10/350,880

(22) Filed: Jan. 24, 2003

(65) Prior Publication Data
US 2003/0142723 A1    Jul. 31, 2003

Related U.S. Application Data

(60) Provisional application No. 60/351,969, filed on Jan. 25, 2002.

(51) Int. Cl.
    *A61B 5/01* (2006.01)
(52) U.S. Cl. .............. 600/474; 600/549; 374/121; 374/129; 374/132; 374/133
(58) Field of Classification Search ............ 600/474, 600/549; 374/121, 126, 128, 129, 132, 133
    See application file for complete search history.

(56) References Cited

U.S. PATENT DOCUMENTS

| | | | |
|---|---|---|---|
| 3,491,596 A | 1/1970 | Dean | 73/355 |
| 4,797,840 A | 1/1989 | Fraden | 702/104 |
| 5,115,815 A | 5/1992 | Hansen | 600/474 |
| 5,813,982 A | 9/1998 | Baratta | 600/398 |
| 6,312,393 B1 | 11/2001 | Abreu | 600/558 |

FOREIGN PATENT DOCUMENTS

| | | |
|---|---|---|
| CN | 2304113 Y | 1/1999 |
| CN | 1245951 A | 3/2000 |

OTHER PUBLICATIONS

Polivka's, "Microwave Radiometry and Applications," International Journal of Infrared and Millimeter Waves, vol. 16, No. 9 (XP 000534670) pp. 1593-1672, Sep. 16, 1995.
International Search Report PCT/US03/02411, Mailed May 12, 2003.
Written Opinion from PCT/US03/02411, mailed Jan. 22, 2004.
International Preliminary Examination Report for PCT International application No. PCT/US03/02411. 11 pages, Mailed May 21, 2004.

*Primary Examiner*—Ruth S. Smith
(74) *Attorney, Agent, or Firm*—Baker Botts L.L.P.

(57) ABSTRACT

A method and apparatus for measuring the core temperature of an animal or human. Emissions from the eyeball are detected, at one or more wavelengths selected on the basis of various factors, including the ability of that wavelength to reach the interior of the eyeball. An illumination marker shines a spot of light on the eyeball, such that the spot corresponds to the area from which emissions are being detected.

36 Claims, 2 Drawing Sheets

METHOD AND APPARATUS FOR RAPID, NON-CONTACT MEASUREMENT OF THE CORE TEMPERATURE OF ANIMALS AND HUMANS

RELATED PATENT APPLICATION

This application claims the benefit of U.S. Provisional Application No. 60/351,969, filed Jan. 25, 2002 and entitled "Means and Apparatus for Rapid, Accurate, Non-Contact Measurement of the Core Temperature of Animals and Humans".

TECHNICAL FIELD OF THE INVENTION

This invention relates to temperature sensing devices, and more particularly to a device for measuring temperature from the black body emissions of the eye.

BACKGROUND OF THE INVENTION

In the United States' cattle industry, annual mortality of cattle due to disease is estimated to be in the hundreds of millions of dollars. A reliable method of determining the health of a cow or the presence of disease is by assessing the body temperature of the animal. In the case of infections, environmental factors, or toxins, a cow's temperature will elevate. These elevations are diagnostic to veterinarians in the diagnosis of disease and disease conditions in cattle. In the day-to-day production of cattle, the evaluation of the presence of increased body temperature or fever is under utilized due to time constraints and the need to physically restrain the animal. This under utilization of temperature evaluation delays the diagnosis of disease and therefore increases the use of antibiotics and loss of animals.

A need exists for rapid and accurate measurement of the core temperature of animals, particularly, but not limited to, domestic food animals such as cattle, sheep, and goats, as well as humans and horses. Core temperature, the internal body temperature, has been difficult to measure accurately without physical contact with the interior of the body.

Traditionally, to obtain temperature measurements, clinical thermometers have been inserted rectally or orally and must remain in position for periods of several minutes to obtain a stable reading. This usually requires restraint of the animal, which is time consuming and labor intensive. Typically, the body temperature of cattle is measured with a clinical mercury Fahrenheit thermometer or with a digital thermometer. A mercury thermometer has a scale ranging from 94 F. to 110 F. and each degree is divided into $\frac{1}{5}$ths. The thermometer requires shaking the mercury column into the bulb end. The thermometer is then lubricated or moistened and manually inserted its full length into the rectum. It remains in the rectum for a minimum of 3 minutes to obtain an accurate reading. As most animals object to this procedure, the animal must be physically restrained during this time.

In recent years, temperature sensors of low thermal mass, such as miniature thermocouples or thermistors, have been used with an electronic digital readout to make the more rapid digital thermometers. However, these devices still require oral or rectal insertion and restraint of the animal but the time for accurate measurement is only one minute.

Other approaches to animal temperature measurement are based on sensing the thermal emission energy, the so called black body emission. This energy is emitted as a wide band electromagnetic spectrum by all heated bodies and has a wavelength distribution and intensity in proportion to temperature. This emitted energy is detected by use of a non-contact microwave, millimeter (mm) wave, or infrared (IR) sensors. Thermal emission measurement is rapid, but the accuracy by which the thermal emission is related to temperature is affected by two factors, in addition to instrumental errors, if any. The first factor is how accurately an emitting surface that is accessible for measurement relates to the core temperature. This frequently poses a problem with animals and humans in that skin may not be a true representation of the internal temperature. This is particularly a problem with IR, where the depth within a body from which the emission is detected is very shallow and is essentially proportional to the outer temperature of the skin. The second factor, surface emissivity, also affects the amount of thermal emission from a body at a given temperature. This causes temperature measurements, based on thermal emissions, to vary depending on the color and the physical properties of the materials being measured. To attempt to overcome this source of error, some IR thermal emission thermometers use a probe inserted into the ear. However, surface emissivity in the ear can vary due to varying amounts and types of debris and these can limit the accuracy. In another variation, an insert is placed in the ear of the animals to provide a constant emissivity target for the IR sensor. The insert must be in the ear for a sufficient time to reach thermal equilibrium prior to measurement, which is undesirable from cost and time considerations.

The possibility of measuring the core temperature of cattle by remote (hands-off) sensing has been of great interest over the past 30 years or more. Previous approaches have been based on (1) passive detection of the magnitude of the IR or microwave energy that is emitted in proportion to the temperature and wavelength (in accordance with Planck's law) from most materials including human or animal hide or ear (interior); (2) the use of implants and/or tags which use contact type thermal sensors (thermistors, thermocouples, etc.) and usually a wireless means of reading out the data on demand; and (3) the use of ingested temperature sensing capsules which contain a temperature sensor and a radio frequency (VHF or UHF) transmitter or transponder to communicate the temperature data from the interior of the animal to an outside read out unit. None of these previous devices or approaches are completely satisfactory due to cost, poor accuracy, practical application limitations, or other reasons.

Existing passive IR emission methods are of limited accuracy (+/−1 degree or worse). These methods are based on sensing surface (skin or hide) temperature and have not been adequate for accurate, direct measurement of animal temperature. Skin temperature is not always an accurate indication of the core temperature of the animal. Also, the emissivity of hair-covered skin is variable and, with IR, will not provide accurate skin temperature nor core temperature indications.

DETAILED DESCRIPTION OF THE INVENTION

The invention described herein provides rapid, accurate non-contact measurement of electromagnetic thermal emission and relates such measurements to the core temperature of the animal or person. It overcomes the limitations of previous thermal emission thermometers by non-contact sensing of thermal emissions only from the eye of the subject. The eye provides a target with many desirable properties for such measurements. It is readily accessible, generally very clean, has a high emissivity, is quite uniform from one animal to another of the same specie, and is continuously bathed with fresh body fluids, internally and externally that maintain the eye near the core temperature. The wavelength of eye emissions that are sensed for such temperature measurements may be in the microwave, millimeter wave, or IR (long to short wavelengths). It may also be a combination of more than one wavelength within these ranges, optimized to be most suitable for the intended application.

Criteria for optimization of the detected wavelength include: (1) suitability for non-contact sensing of the emission from a spot the size of the eye, or a selected portion thereof, while minimizing the sensitivity to emissions from regions outside the said spot; (2) maximizing the depth into the eye from which emissions are detected to insure the highest correlation with core temperature, while maintaining an acceptable instrument sensitivity measurement error; (3) freedom from effects of the environment, natural and manmade, on the measurement; and (4) measurement time for sufficient accuracy.

The method uses electromagnetic (black body) emission from the eye of the animal to accurately and rapidly assess temperature. This hands-off method is effective and efficient in the early detection of disease. This facilitates the rapid use of proper treatment regiments and reduces the overuse of antibiotics and thus the antibiotic residue in meat and milk supplies.

In the example of this description, the method obtains accurate core temperature indications by using the measured thermal electromagnetic emission at one or more wavelengths, from the eye of an animal. The eye is accessible from outside the animal and has the possibility of providing an accurate core temperature indication—especially if emission from within the eyeball is utilized.

Figure 1:
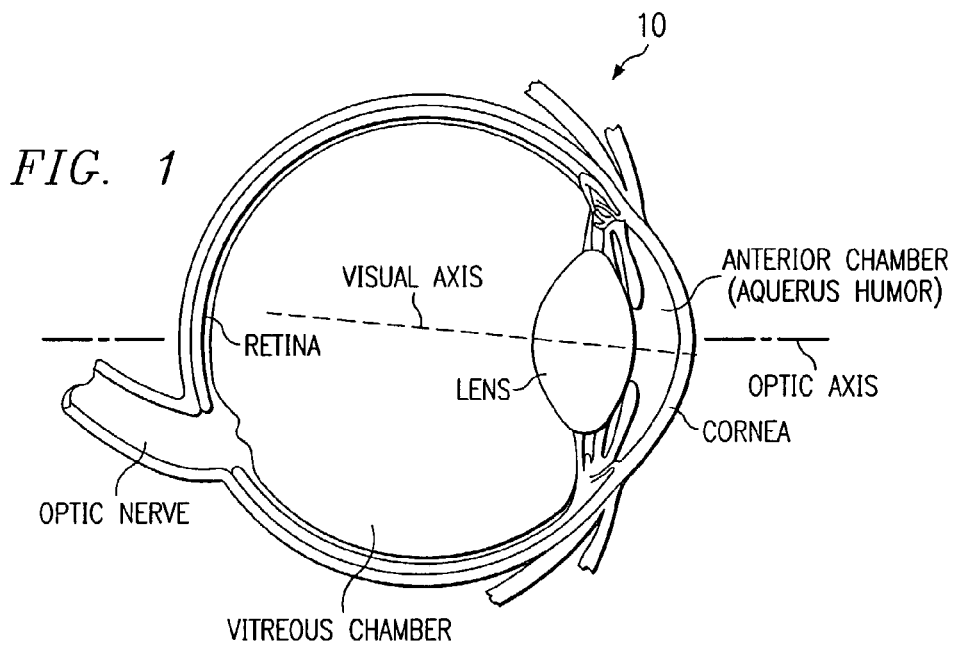
FIG. 1 is a cross sectional view of the eye of a mammal, such as a cow.

FIG. 1 is a cross sectional view of the eye of a mammal, such as a cow or human. The eyeball is continuously bathed by body fluids, and has continuous blood flow within the exterior wall and in the eye socket and eyelid regions. These tend to keep the eye temperature very near the body core temperature and to keep the external surface relatively clean.

It is known from laser safety guidelines that only visible and near-infrared (400-1400 nm) wavelengths of electromagnetic radiation (light) can readily penetrate the aqueous, cornea, iris, lens, and vitreous and be focused on the retina at the back interior of the eyeball. Similarly, emissions from these interior regions will pass through the front of the eye and may be detectable externally by use of a suitable sensor. Mid-infrared (1400-3000 nm) and far infrared (3000 nm to 1 mm) are absorbed in the front surface of the eye, though some mid-infrared (sometimes called short wave IR) of (1.4-2.5 microns) penetrates deeper through the cornea region. Far infrared used to detect emission from the eye would be primarily sensing emission from the exposed outer surface of the eye—due to absorption of emissions coming from the interior by the near surface layers of the eyeball. While this emission could be near the core temperature, the outer surface may not always be sufficiently insulated from the effects of environmental temperatures, wind, rain, etc. to consistently provide an accurate correlation with core temperature. Emission from the lens, vitreous, and retina, which are deeper within the eyeball, meet the criteria for more accurate correlation with the core temperature. Sensing of the emissions from the interior regions of the eye provides a useful basis for obtaining accurate core temperature with a non-contacting sensor.

Figure 2:
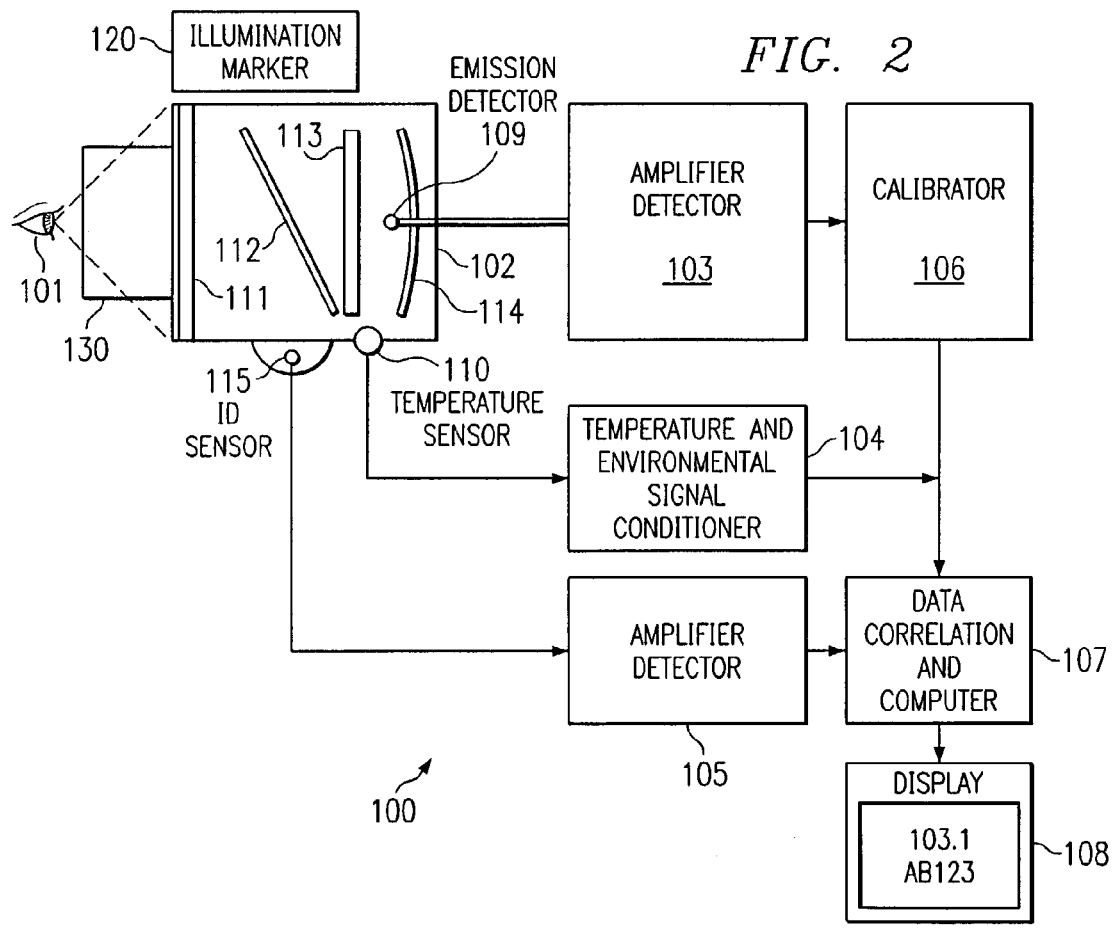
FIG. 2 is a block diagram of a first embodiment of the invention.

FIG. 2 illustrates a core temperature measurement device 100 in accordance with the invention. A sensor unit 102 contains the detector 109 and auxiliary apparatus needed to sense the thermal (Planck) emission of selected wavelengths from the eye 101 of an animal or human. The sensor unit 102 also contains various optics elements, such as lenses, a mirror, and filters for focusing the emission of interest on the detector 109 and filtering the emission to allow only wavelengths of interest to reach the detector 109. It may also contain a means to reduce the temperature of the detector 109 to increase the sensitivity of said detector and it may also cool optical lens and filters to reduce thermal emissions from all components which would be seen by the detector 109. In the example of FIG. 2, sensor unit 102 contains an IR filters 111 and 113, a half mirror 112, a spectral filter 113, and a parabolic reflector 114. A light shield 130, for example, a rubber eyepiece, may be used to minimize non-related thermal emissions during the measurement.

In the example of FIG. 2, sensor unit 102 detects IR emission at the spectral wavelength range of interest. The optical components provide a sensitive aperture near the size of the eye or a selected portion thereof. The sensor unit 102 provides such an aperture at a distance of several inches or more from the front of the unit.

The sensor unit 102 also contains auxiliary sensors for sensing the temperatures of the assembly and other environmental parameters needed to compensate for their effects on the core temperature measurement. In the example of FIG. 2, a temperature sensor 110 obtains a temperature measurement. An identification (ID) sensor 115 senses data needed to identify the particular animal or person being measured. For example, ID sensor 115 could be used to read a bar coded tag on the animal or it could sense unique optical characteristics of the eye. The optional filter 111 allows a broad wavelength band of emission of interest to pass to the detector 109 but rejects emissions outside this range. The broad wavelength bands of interest include those used for eye temperature measurement and those used for animal identification and may also include those used for producing a visible spot for aiming the sensor 102 toward the eye to be measured. It also acts as a dust and water seal to protect the interior of 102 from the environment. Filter 113 passes wavelengths needed for the temperature sensing. Means to use multiple filters of different wavelength bands are also a part of our invention.

Illumination marker 120 provides a visual indication of the region of the eye 101 that is being examined for core temperature measurement. In other words, marker 120 provides a spot of visible light on the eye that corresponds to the center receiving area of sensor unit 102. For example, marker 120 might provide a spot of light on the eye when the detector unit 102 is properly aimed toward the eye. The marker 120 permits the operator to stand away from the animal and know that sensor unit 102 is aimed in the desired direction. The spot of light serves the additional function of attracting the animal's attention and thereby facilitating measurement.

The output signal from the emissions detector 109 goes to the amplifier-detector 103 that boosts the amplitude of the signal and detects the amplitude of the emissions from the eye. The detected signal is normalized and calibrated in terms of the temperature of the emitter by the calibrator 106. The emission data from measurements of live animals is calibrated to rectal thermometer temperatures. During such initial tests the cow is restrained to minimize movement and allow access for adequate measurements to be made. Vaccines, such as for pasturella, provide a harmless means for temporarily raising the temperature of test cattle by up to about 5 degrees above the normal range of 100-103 F.

The output of the temperature sensor 110 (and any other environmental sensors) is connected to the temperature and environmental signal conditioner and control unit 104, where the signal is amplified, normalized and used to provide correction data needed to compensate for and improve the accuracy of relating the emissions data to the core temperature of the animal or human. For example, changes in temperature can affect the detector sensitivity as well as the magnitude of non-related thermal emissions that reach the detector. Corrections and compensations that are needed are performed by the data correlator and computer 107. If desired, conditioner and control unit 104 may include means for maintaining sensor unit 102 at a constant temperature. It may also be cooled so as to improve sensitivity. For example, a thermoelectric cooler or cryogenic fluid may be used.

Identification sensor 115, through amplifier-detector 105 also provides data to the data correlator and computer 107, which provides a visual, numerical readout of the core temperature, identification number, time, date, environmental temperature, and other pertinent information on display 108. The core temperature is computed from the amplitude of the eye emissions, of a selected wavelength, corrected for effects, if any, of environmental temperature, distance from the eye to the sensor assembly 102, region of the eye that is measured and the type of animal as well as for instrumentation variables of amplifier gain, detector sensitivity, and pre-detection bandwidth. This readout data is also stored in the computer 107 for later recovery or for transfer to an external data storage facility for long time retention. Display 108 may also display other information, such as the animal's rectal temperature, it's breed and other identifiers.

Figure 3:
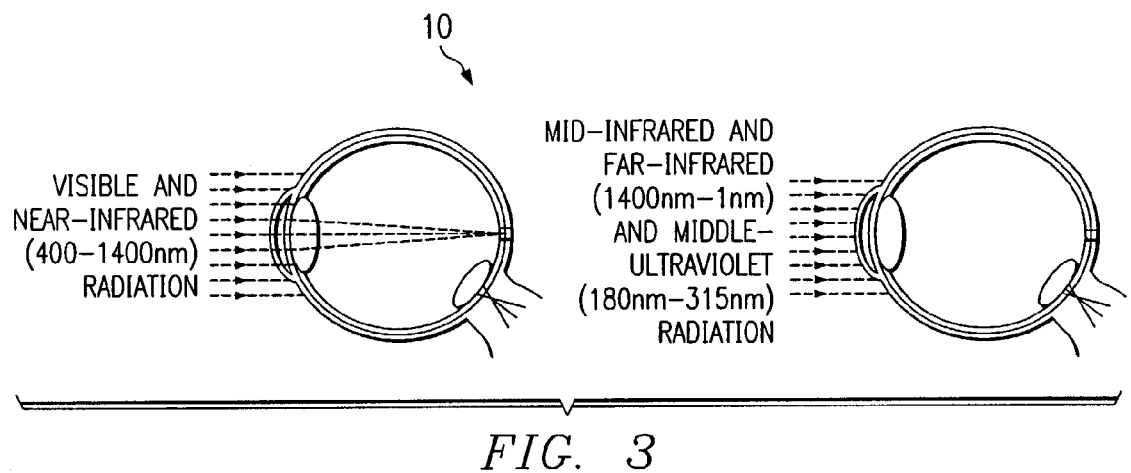
FIG. 3 illustrates the relative depth of emission of various wavelengths from the eye.

FIG. 3 illustrates the infrared and visible light transmission properties of the various regions of an eye 10. As illustrated, the visible and near-infrared (400-1400 nm) wavelengths of light are transmitted with small attenuation through the cornea, aqueous, iris, lens and vitreous and focused on the retina at the back of the eyeball. Longer wavelength light in the mid-infrared and far-infrared (wavelength range of 1400 nm to 1.0 mm) are, except for a few discrete bands of wavelengths, greatly attenuated in the cornea but some mid-IR wavelengths (near 1600-1800 nm and 2150-2350 nm), may penetrate an appreciable distance into the eye interior. Similarly, thermal emissions will be transmitted from the retina-vitreous region through the lens, cornea, aqueous, and iris to the outside in corresponding wavelengths of low attenuation. Mid-IR at wavelengths 1000-2400 nm may also be transmitted through the sclera which covers the entire eyeball except for that covered by the cornea. Thus, far-infrared emissions from the eye will be primarily from the surface, whereas the weaker mid- and near-infrared emissions, especially certain bands of wavelengths, will penetrate the front part of the eye and be more representative of the interior eye temperature. Millimeter waves and longer wavelengths of emission will be representative of temperatures deeper within the eye interior than those of the far infrared wavelengths. Far infrared wavelengths, may be used to sense emissions from the tear duct area of the eye and correlated to core temperature.

For best transmission of electromagnetic emission data from deeper into the eye, the shorter IR (0.8 to 1 micron) wavelength ranges are advantageous; but, conversely at body temperatures, the emission amplitude increases drastically at longer wavelengths. The wavelength range that is sensed is set by the type of detector 109 and by the use of filters, such as filter 111, ahead of the detector to restrict the range of emission wavelengths that fall upon the detector. For wavelengths greater than about 1.5 microns a broadband thermopile detector or some photodiodes, such as cooled extended range indium arsenide photodiode detectors, provide good sensitivity and are commonly used either with or without IR filters to restrict the bandwidth of the detected emission. For shorter wavelengths, other photodiodes (germanium, silicon, gallium arsenide, with various dopants) or photomultiplier type sensors provide optimum sensitivity and are generally preferred, either cooled or uncooled. IR filters are used to restrict the wavelength range of the emission that is detected. Otherwise the emissions from several regions of the eye would be detected simultaneously. The surface emissions, representing the surface temperature of the eye, can be much larger than those from deeper into the eyeball. Unless corrected for wavelength (or otherwise) these surface emissions will cause errors in measuring the desired (internal) emissions that, in most cases, will be most representative of the core temperature. A far-IR detector will respond entirely to the surface temperature, which in general, is much more susceptible to environmental effects than are the internal emissions. Conversely, the low attenuation in the eyeball at visual and near-IR wavelengths would be most suitable for transmitting emissions from deep into the eye back to the retina region. This is desirable since the retina region is best isolated from environmental effects and the temperature is best correlated with core temperature. Unfortunately, there is a problem with the intensity of the Planck emission at these short (visual and near-infrared) wavelengths. In practice the emission from a black body at live animal temperatures (300-310 K) is so weak that it is undetectable at visual wavelengths even with the best detectors. Even at 1000 nm, the emission is at these temperatures is still so weak that it is not rapidly detectable. The question then becomes, for a small, hand held thermal emissions detector are there any IR wavelengths where internal eyeball temperatures are accurately measurable (to 0.1 K) in an acceptably short time (few seconds), from a stand off distance (range) of 30 cm (12-inches) or more. The answer is yes if a cooled extended (wavelength) range indium arsenide photodiode detector, or an equivalent, is used at wavelengths in the 1600-2400 nm range, particularly in either or both of the two bands, 1600-1800 and 2150-2350 nm that were previously mentioned. A preferred embodiment of 102 of our invention uses a photodetector with optical filters that will pass emissions of nominal wavelengths 1600-1800 or 2150-2350 nm, or both, along with collecting and focusing optics that will create an IR sensing region (of a size near that of the cornea) when the detector 102 is at a selected distance, for example 12-inches from the eye to be measured. These concepts and specifications are key elements of our invention.

Another detail of the invention addresses additional means that are utilized to further reduce the effects of emissions coming from different depths in the eye or from extraneous, non-related sources and to thereby improve the measurement accuracy. The desired thermal emissions that best correlate with the core temperature come from the interior of the eye. However, other (unwanted) thermal emissions will be detected from the surface and near-surface of the eye. These may be at the same temperature as the desired interior emissions, at a higher temperature or at a lower temperature. In any case the surface and near-surface emissions can be expected to vary a small amount with changing environmental temperature, wind and rain and thereby cause measurement errors. The interior emissions will only be of appreciable intensity at the wavelengths where the eye attenuation is minimal (these are the same wavelengths as the detector filter) while the surface and near-surface emissions have a much wider spectrum with intensity increasing at longer wavelengths. By comparing the total emission detected through the narrow band filter with the total emission detected with a wider band filter, or with no filter, the component due to internal emission will not change (except for loss in the narrow band filter) while the detected surface emissions will increase significantly when a broad band filter is used. By knowing the spectral band pass characteristics of the broad filter and of the detector, the emissions from the eye surface and spurious sources are determined and a correction factor is derived in computer 107 for the interior eye temperature measurement. This factor, along with the amplified signal from the emissions detector and the calibration factors are used to calculate, in computer 107, an accurate core temperature for each measurement.

Figure 4:
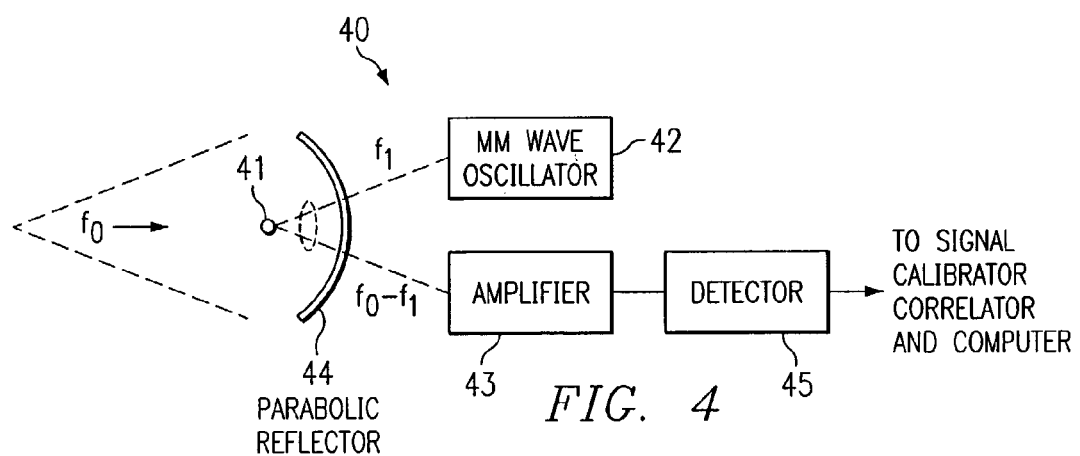
FIG. 4 illustrates an alternative embodiment of the sensor unit of FIG. 1.

FIG. 4 illustrates a micro- and millimeter wavelength detector 40, which is an alternative embodiment to the sensor unit 102 of FIG. 2. Another possibility, within the scope of the invention, for obtaining eyeball interior temperature data is to detect emission in the longer wavelength (compared to the longest IR) microwave and millimeter (mm) range. Sensitive detectors, using normal radio frequency superhetrodyne (mixer-oscillator) techniques, are available at modest costs for the nominal 3 mm (80-100 GHz) range as a result of commercial and government interest in this part of the spectrum. In practice, these detectors are more sensitive than thermopiles and can readily detect the lower level blackbody emissions at these longer wavelengths to accuracies of 0.1 F. degree or better, depending on the observation (signal integration) time and the pre-detection bandwidth. While antenna size, and the attendant near-field, far-field limitation, can pose a problem in restricting the detection area to that of the eye, this can be overcome by making the maximum distance, from antenna to the eye (to be measured), several inches and by use of well known antenna approaches to providing a narrow beam. Even a 1-inch diameter parabolic dish antenna, for example, could have a far field beam width on the order of 10 degrees and a focused near field that would encompass the animal or human's cornea area.

An antenna-detector-mixer device 41 may be implemented as a small integrated circuit. The antenna portion picks up the eye emissions at selected wavelengths, the mixer portion mixes the emission signal with the signal from oscillator 52, and the detector portion converts the emission signal to a lower frequency for amplification by amplifier 53. The antenna size and the oscillator frequency are functions of the desired emission wavelengths to be detected.

For all wavelengths (IR, millimeter, and micrometer), detection of eyeball emissions at two or more wavelength bands offers the opportunity to minimize the effects of environmental temperature and background emission levels for a given temperature measurement. For example, signals at a first wavelength can be compared to signals from a second wavelength. For this implementation, the sensor unit 102 of FIG. 2 (or the antenna-mixer-detector 41 of FIG. 4) could be modified to accommodate more than one emissions signal path or detector. This could be accomplished by the use of multiple filters and detectors. Alternatively, a single detector could be used, and a wheel or some other electromagnetic or electromechanical or magneto-optic device used to provide a succession of filters to that detector.

Although various embodiments of the invention are described herein, the scope of this invention is not limited to these embodiments nor do alternative embodiments need to include all the features described in FIG. 2. Other implementations could well be within the scope of this invention.

The invention claimed is:

1. A device for measuring the core temperature of a subject animal or human, comprising:
   a non-contact sensor unit for non-contact sensing of thermal emissions only from the eye of the subject, the sensor unit having a filter operable to permit only selected wavelengths of the thermal emissions to be detected, and having a detector operable to detect selected wavelengths of the thermal emissions and to generate an electrical signal corresponding to the intensity of the thermal emissions;
   wherein the selected wavelengths are emitted from a particular depth within the eyeball;
   an amplifier unit for amplifying the electrical signal from the sensor-and for producing an amplified electrical signal;
   a data processing unit for converting the amplified signal to raw temperature data and for determining core temperature data based on the raw temperature data; and
   a display for displaying the core temperature data of the subject.

2. The device of claim 1, wherein the sensor unit detects only near infrared emissions.

3. The device of claim 1, wherein the sensor unit detects millimeter wavelength emissions.

4. The device of claim 1, wherein the sensor unit detects micrometer wavelength emissions.

5. The device of claim 1, wherein the sensor unit detects more than one central wavelength.

6. The device of claim 1, wherein the sensor unit has a single light path for a single central wavelength.

7. The device of claim 1, wherein the sensor unit has more than one light path for detecting more than one central wavelength.

8. The device of claim 1, further comprising a calibration unit for delivering calibration data to the data processing unit.

9. The device of claim 1, further comprising a temperature sensor for measuring the temperature of the device.

10. The device of claim 1, further comprising a light shield for shielding the sensor unit from thermal emissions unrelated to emissions from the eye.

11. The device of claim 1, further comprising an illumination marker operable to emit a beam of visible light corresponding to a receiving area of the sensor unit.

12. The device of claim 1, further comprising an identification sensor for detecting an identification code associated with the subject.

13. The device of claim 1, wherein the filter passes wavelengths from 1000-2500 nanometers.

14. The device of claim 1, wherein the filter passes wavelengths from 1600-1800 nanometers.

15. The device of claim 1, wherein the filter passes wavelengths from 2150-2350 nanometers.

16. The device of claim 1, wherein the filter passes wavelengths from 1600-1800 and 2150-2350 nanometers.

17. The device of claim 1, wherein the sensor is operable to detect thermal emissions from a first bandwidth and a second bandwidth, wherein the first bandwidth may be wider than the second bandwidth or centered on a different wavelength, or both; and wherein the data processing unit is further operable to compare the detected amplitude of the signal from the first bandwidth to the amplitude of the signal from the second bandwidth, and to compensate the temperature data based on the comparison.

18. A method of measuring core temperature of a subject animal or human, comprising the steps of:
   using a non-contact sensor unit for non-contact sensing of thermal emissions only from the eye of the subject, by using a filter to filter thermal emissions from the eyeball of the subject, such that only selected wavelengths pass through the filter and by using a detector to detect the filtered thermal emissions;
   wherein the thermal emissions have a wavelength associated with a particular depth within the eyeball;
   generating an electrical signal corresponding to the intensity of the emissions;
   receiving the electrical signal at a data processing unit;
   converting the electrical signal to raw temperature data;
   processing the raw temperature data by using the raw temperature data to determine core temperature data; and
   displaying the core temperature data.

19. The method of claim 18, wherein the step of detecting the filtered emissions is performed by detecting a wavelength appropriate for a particular depth into the eyeball.

20. The method of claim 18, wherein the step of detecting the filtered emissions is performed by controlling the effective sensing area of the detector.

21. The method of claim 18, further comprising the step of calibrating the core temperature data, based on data from rectal thermometry measurements.

22. The method of claim 18, further comprising the step of measuring the sensor temperature and compensating the core temperature data with the measured sensor temperature.

23. The method of claim 18, wherein the step of detecting the filtered emissions is performed by detecting multispectral thermal radiation data.

24. The method of claim 18, further comprising the step of detecting identification data associated with the subject.

25. The method of claim 24, wherein the step of detecting identification data is performed by reading data from a tag which is attached to or inserted into the subject.

26. The method of claim 24, further comprising the step of storing the identification data and the core temperature data.

27. The method of claim 18, further comprising the step of maintaining the sensor unit at a constant temperature during the sensing step.

28. The method of claim 18, further comprising the step of cooling the sensor unit during the sensing step.

29. The method of claim 18, further comprising the step of illuminating an area on the eye from which the thermal emissions are detected.

30. The method of claim 18, wherein the filtering step passes wavelengths from 1000-2500 nanometers.

31. The method of claim 18, wherein the filtering step passes wavelengths from 1600-1800 nanometers.

32. The method of claim 18, wherein the filtering step passes wavelengths from 2150-2350 nanometers.

33. The method of claim 18, wherein the filtering step passes wavelengths from 1600-1800 and 2150-2350 nanometers.

34. A method of measuring core temperature of a subject animal or human, comprising the steps of:
   using a non-contact sensor unit for non-contact sensing of thermal emissions only from the eye of the subject, by using a filter to filter thermal emissions from the eyeball of the subject, such that only selected wavelengths pass through the filter and by using a detector to detect the filtered thermal emissions;
   generating an electrical signal corresponding to the intensity of the emissions;
   receiving the electrical signal at a data processing unit;
   converting the electrical signal to core temperature data;
   displaying the core temperature of the subject data on a display readout; and
   detecting identification data associated with the subject.

35. The method of claim 34, wherein the step of detecting identification data is performed by reading data from a tag which is attached to or inserted into the subject.

36. The method of claim 34, further comprising the step of storing the identification data and the core temperature data.

* * * * *